(12) United States Patent
Niehaus et al.

(10) Patent No.: US 12,027,979 B2
(45) Date of Patent: Jul. 2, 2024

(54) BATTERY PATH IMPEDANCE COMPENSATION

(71) Applicant: Apple Inc., Cupertino, CA (US)

(72) Inventors: Adriane S. Niehaus, Saratoga, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 560 days.

(21) Appl. No.: 17/198,899

(22) Filed: Mar. 11, 2021

(65) Prior Publication Data

US 2021/0391796 A1    Dec. 16, 2021

Related U.S. Application Data

(60) Provisional application No. 63/037,172, filed on Jun. 10, 2020.

(51) Int. Cl.
  *H02M 1/00*    (2007.01)
  *H02J 7/02*    (2016.01)
  *H02M 3/158*   (2006.01)
(52) U.S. Cl.
  CPC ............. *H02M 3/1582* (2013.01); *H02J 7/02* (2013.01); *H02M 1/0003* (2021.05); *H02J 2207/20* (2020.01)

(58) Field of Classification Search
  USPC .......................... 320/106, 108, 10, 140, 142
  See application file for complete search history.

(56) References Cited

U.S. PATENT DOCUMENTS

| 7,084,282 | B2 | 8/2006 | Nelson |
| 7,411,316 | B2 | 8/2008 | Pai |
| 7,940,031 | B2 | 5/2011 | Kimura |
| 2006/0170400 | A1* | 8/2006 | Pai ........................ H02M 3/158 323/265 |
| 2014/0097895 | A1* | 4/2014 | Khlat ..................... H03F 3/245 330/251 |

* cited by examiner

*Primary Examiner* — Brian Ngo
(74) *Attorney, Agent, or Firm* — FLETCHER YODER PC

(57) ABSTRACT

A power system for a battery powered device can include a first stage power converter, a charge injector, and a bypass switch. The first stage power converter can be configured to have an input coupled to a battery and operable to convert a battery voltage to a level higher than a main voltage bus of the battery powered device. The charge injector can include an input coupled to the output of the power converter and an output configured to be coupled to the main voltage bus. The bypass can include one or more bypass switches operable to selectively couple an output of the power converter to the main voltage bus, bypassing the charge injector. The charge injector may be selectively operable as a current source configured to draw power from an output of the power converter and the battery to reduce voltage dips of the main voltage bus.

17 Claims, 3 Drawing Sheets

BATTERY PATH IMPEDANCE COMPENSATION

BACKGROUND

Consumers have increasingly adopted and come to rely on a variety of personal electronic devices. Such devices include smart phones, tablet computers, smart watches, and even laptop computers, as well as accessories for such devices, including styluses, wireless earphones, and the like. These devices often rely on internal rechargeable batteries to provide operating power, with lithium ion based battery chemistries being a common example. One trait of all battery chemistries is that as the battery ages, its ability to provide power may degrade to a greater or lesser degree. Battery aging is a function of a number of use-related variables including, without limitation, number of charge/discharge cycles, chronological age, temperature, depth of charge/discharge cycles, rate of charge discharge, etc.

The reduced capability of a battery as it ages may be undesirable from a user perspective. For example, reduced energy storage capacity may reduce the run time that a personal electronic device can support between battery charging events. Also, the electronic systems of personal electronic devices have certain electrical requirements, including, for example, a minimum operating voltage, and an amount of current that is required. The output voltage of all batteries is reduced as battery discharge current increases because of the internal impedance of the battery. This impedance generally increases as the battery ages. Thus, as a battery ages, its ability to maintain a sufficient output voltage while providing sufficient current to maintain operation of the electronic systems of a personal electronic device may become compromised. This may require a reduction in device performance to prevent undesirable shutdown events of the personal electronic device.

Thus, what is needed in the art are improved power supply circuits that can facilitate continued high performance operation of personal electronic devices even with batteries having altered characteristics due to battery aging.

SUMMARY

A power system for a battery powered device can include a first stage power converter configured to have an input coupled to a battery and operable to convert a battery voltage to a level corresponding to a voltage higher than the main voltage bus of the battery powered device. There may be an intermediate charge storage element at the output of the first stage power converter. The power system can also include a second stage charge injector having a high side input coupled to the output of the power converter, a low side input coupled to the battery voltage, and an output configured to be coupled to the main voltage bus. The power system can still further include one or more bypass switches operable to selectively couple the battery voltage to the main voltage bus. The charge injector is operated as a current source, such as a switched current source.

The charge injector can include an inductor, a high side switch coupled between an output of the first stage power converter and a first terminal of the inductor, a low side switch coupled between the battery and the first terminal of the charge injector inductor, wherein a second terminal of the inductor may be coupled to the main voltage bus. The high side switch and the low side switch may be controlled by a current window controller configured to deliver a geared average current to the main voltage bus. The current window controller may be configured to alternately close the high side switch and open the low side switch, thereby charging the inductor with energy from the first stage power converter and open the high side switch and close the low side switch, thereby discharging the inductor to the main voltage bus while drawing current from the battery. The first stage power converter is a charge pump, such as a multiphase, series-parallel charge pump. Alternatively, the first stage power converter may be an inductive boost converter. The power converter and the charge injector may be an integrated device.

A charge injector for use in a power system of a battery operated device can include a first input configured to be selectively coupled to an output of a first stage power converter, wherein the first stage power converter may be configured to convert a battery voltage to a level higher than a main voltage bus of the battery operated device. The charge injector can further include a second input configured to be selectively coupled to the battery. The charge injector can still further include an output configured to be coupled to a main voltage bus of the device. The charge injector can still further include an inductor coupled to the output. The charge injector can still further include a high side switch coupled between the first input and the inductor and a low side switch coupled between the second input and the inductor. The high side switch may be operable to provide a current path from the first stage power converter to the main voltage bus through the inductor. The low side switch may be operable to provide a current path from the battery to the main voltage bus through the inductor. The charge injector can still further include a controller configured to alternately operate the high and low side switches to deliver an average current to the main voltage bus. The controller may be a current window controller.

A method of operating a current injector to deliver an average current to a voltage bus can include: determining whether voltage droop support is required to minimize a voltage dip of the voltage bus associated with a current transient; responsive to a determination that voltage droop support is not required, performing at least one of disabling and bypassing the first stage power converter and charge injector; and responsive to a determination that voltage droop support is required, enabling the charge injector. The method can further include turning on a first switch of the charge injector to deliver an increasing current from a first stage power converter to the voltage bus through an inductor; and turning on a second switch of the charge injector to deliver a decreasing current from a battery to the voltage bus through the inductor. Turning on the first switch may be performed in response to a predetermined minimum current through the inductor, and turning on the second switch may be performed in response to a predetermined maximum current through the inductor. Turning on the first switch to deliver an increasing current from the first stage power converter to the voltage bus through the inductor can include turning off the second switch. Turning on the second switch to deliver a decreasing current from the battery to the voltage bus through the inductor comprises turning off the first switch.

DETAILED DESCRIPTION

Figure 1A:
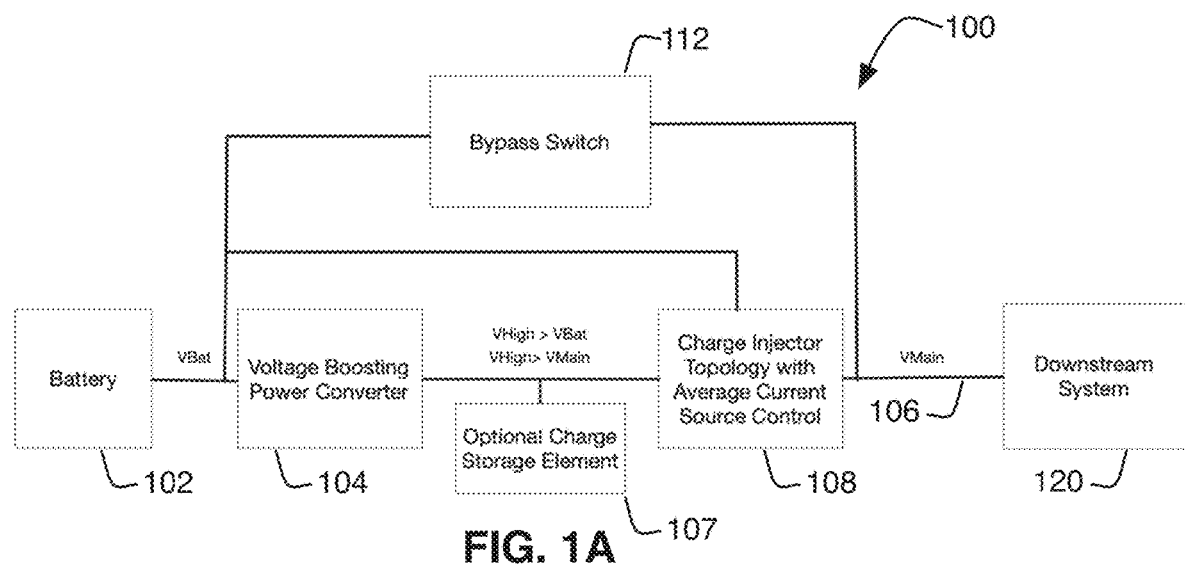
FIGS. 1A and 1B illustrate high level block diagrams of power systems for a personal electronic device.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

As used herein "battery" refers to any of a variety of electrochemical energy storage devices that may be used in a personal electronic device. Many modern personal electronic devices employ some variation of lithium-ion cells for this purpose, although any of a large number of battery chemistries may be used in accordance with the teachings herein. Strictly speaking, the term "battery" refers to a plurality of electrochemical cells that are electrically connected in various configurations (e.g., series and/or parallel) to provide a required voltage and current capacity. Nonetheless, in the colloquial sense and as used herein, battery may refer to either a single cell or a combination of cells.

Figure 1B:
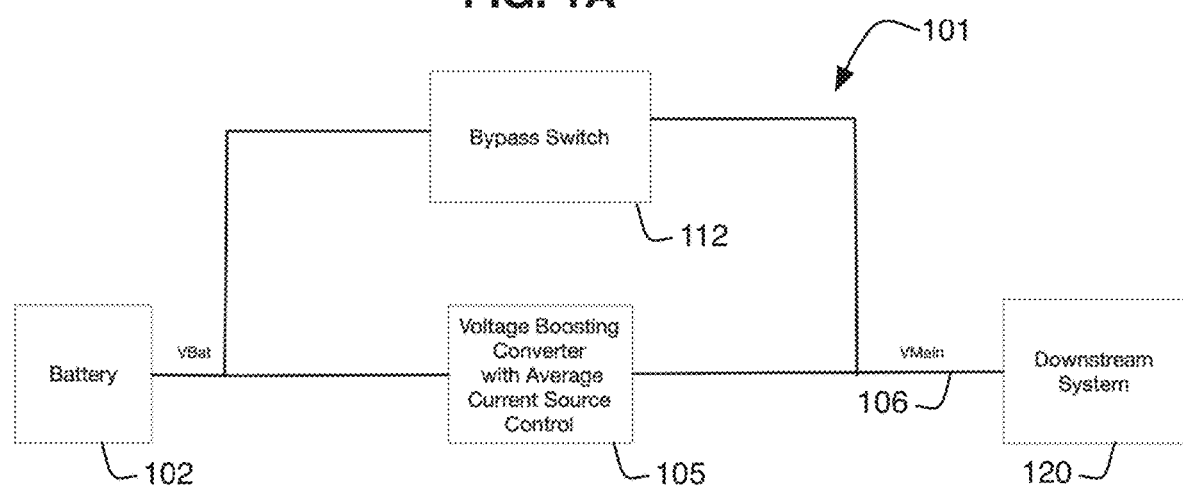

FIG. 1A illustrates a high level block diagram of a power system 100, which may in some embodiments be used to power a personal electronic device. FIG. 1B illustrates a high level block diagram of a power system 101, which may in some embodiments be used to power a personal electronic device. Both power system 100 and power system 101 include a battery 102. Battery 102 may be constructed using any of a variety of battery chemistries, including any of a number of commonly used lithium ion based chemistries. Battery 102 may be charged by a charging circuit (not shown), which may be internal with the personal electronic device or external to the personal electronic device. In some embodiments, the charging circuit may be internal, and may be configured to receive power from an external power source that may be coupled to the personal electronic device by wired or wireless means.

In power system 100, battery 102 may be coupled to a voltage boosting power converter 104. Voltage boosting power converter 104 may be any of a variety of converters or regulators configured to convert the battery voltage into a voltage higher than main voltage bus 106. In some embodiments, power converter 104 will be a switching regulator, such as a boost converter, buck-boost converter, forward converter, flyback converter, etc. In some embodiments, power converter 104 may take the form of a charge pump. The inventive concepts described herein are applicable to personal electronic devices implementing any of the foregoing or other types of power converter 104. In power system 101, battery 102 may be coupled to a voltage boosting converter 105 that incorporates average current source control, and suitable for the main voltage for the variant with direct voltage boosting. As in the embodiment of FIG. 1A, voltage boosting converter 105 can be a switching regulator, such as an inductive boost converter or other suitable voltage boosting converter type.

In both embodiments, main voltage bus 106 may be coupled to downstream system 120, which may include the various components, systems, and subsystems of the personal electronic device, including for example, a display system, a processor system, a storage system, and communication systems, such as radios for wireless communication. These various systems may, in some embodiments, include further power conversion and/or regulation circuitry to adapt the main bus voltage to their own particular requirements.

Power system 100 may also include a charge injector 108 and optional charge storage element 107. Charge injector 108 may be constructed and operated as described in greater detail below to assist in powering main voltage bus 106. If battery 102 is in a suitable condition (age, temperature, state of charge, internal impedance, etc.) to maintain main bus voltage 106 at the present load, bypass switch 112 may enabled (closed), which bypasses voltage boosting power converter 104 and charge injector 108. In this case, charge injector 108 may be disabled. Otherwise, bypass switch 112 may be disabled (opened), and charge injector 106 may be operated as an average current source with peak and valley current control to maintain a minimum voltage on main voltage bus 106 and prevent voltage droop that may, for example, be caused by transient currents drawn from main voltage bus 106. In some embodiments, the charge injector and the power converter may be constructed as a single, integrated device.

For power system 101, in FIG. 1B, only voltage boosting converter 105 is present. Power system 101 does not include a charge injector. However, voltage boosting converter 105 may be controlled in the same fashion as the charge injector (which is described in greater detail below).

Figure 2:
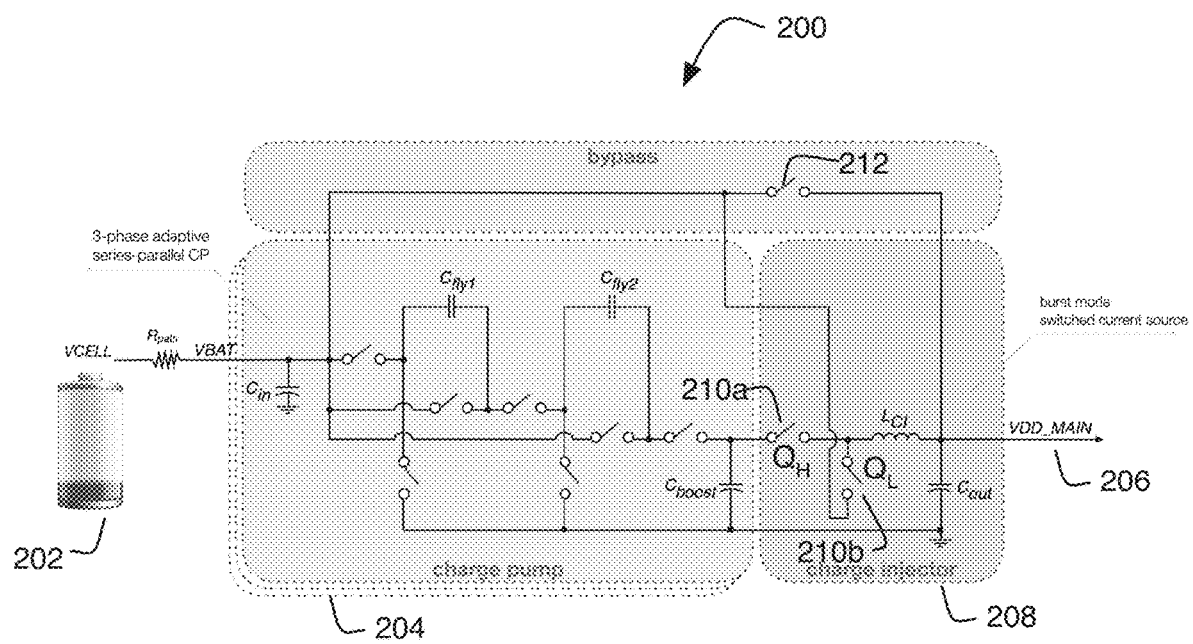
FIG. 2 illustrates a schematic diagram of a power system incorporating a charge injector.

FIG. 2 illustrates a schematic diagram of a personal electronic device power system 200, which provides additional construction details of power converter 204 and charge injector 208. As discussed above with respect to FIG. 1A, power converter 204 may be configured to convert the voltage supplied by battery 202 into a level higher than main voltage bus 206. When the condition of battery 202 is such that it is able to maintain an adequate voltage on output voltage bus 206, bypass switch 212 may be closed, bypassing voltage boosting converter 204 and charge injector 208. Otherwise, if battery 202 is unable to maintain adequate voltage on output voltage bus 206, bypass switch may be opened, and boosting converter 204 and charge injector 208 may be activated to boost the voltage available from the battery.

In the illustrated embodiment, power converter 204 may be a charge pump. More specifically, power converter 204 incorporates a series-parallel charge pump. More specifically still, power converter 204 incorporates a three-phase series-parallel charge pump (meaning there are two additional switching phases that are not depicted in detail, but are illustrated by the dashed rectangle layers in FIG. 2, for a total of three phases). A detailed operational description of the series parallel charge pump is beyond the scope of this application. However, in general, the (unlabeled) switches making up power converter 204 may be selectively opened and closed to selectively charge and discharge the flying capacitors Cfly1 and Cfly2 in various combinations, allowing for a voltage to appear across capacitor Cboost, which is the output of the charge pump/power converter 204. The switches may be implemented using any suitable semiconductor technology, including bipolar transistors, field effect transistors, insulated gate bipolar transistors IGBTs), etc. In some embodiments metal oxide semiconductor field effect transistors (MOSFETs) may be used. Although the illustrated power converter 204 is a charge pump, as noted above, any of a variety of switching converters may be employed, the output of which may be provided to the input of charge injector 208.

As discussed above, as the internal impedance of battery 202 increases with age, there may be certain operating conditions of the personal electronic device in which the bypass path alone cannot maintain a minimum voltage on main voltage bus 206. For example, significant increased current transient events may cause an undesirable voltage dip or droop on main voltage bus 206. Such current transients may be associated with relatively common events in a personal electronic device, such as turning on a display, waking a processing system from a sleep state, increased computational requirements for the processing system, etc. Charge injector 208 may be operated as described in greater detail below to mitigate a voltage droop associated with these events.

In general, charge injector 208 may be operated as a switched, geared, average current source with peak and valley current control to maintain a minimum voltage level for the main voltage bus 206. "Geared," in this context, means discretized in some way. For example, the average current target may be selected from a range of discrete gears, rather than continuous time control as in a traditional control loop. For example, a discretized set of current gears may be 1 A, 1.1 A, 1.2 A, . . . 10 A. An average current target might be 1.25 A, which may be created by dithering between two adjacent discrete gears (i.e., 1.2 A and 1.3 A). A minimum current gear is employed. One potential advantage of a minimum current gear is that, in a light load condition, the converter does not switch unless it is delivering enough power to be worth the cost of switching. This is, in a sense, similar to a pulse frequency modulation (PFM) operating mode, but unlike a traditional PFM mode, the switching frequency is still determined by the ripple current control, and bursts of continuous switching cycles deliver the average current defined by the minimum current gear. The frequency of the burst envelope varies according to load demand. In any case, the average current source operates in a bursted fashion where current is injected only when Vmain drops below an established voltage threshold, and a minimum average current gear is utilized when active to maximize efficiency at light load. During a portion of its operating cycle, charge injector may draw power from power converter 204. During this portion of the operating cycle, charge injector 208 may be charging (i.e., storing energy in) its internal inductor LCI. During another portion of its operating cycle, charge injector may draw power directly from battery 202. During this portion of the charging cycle, power converter 204 may be disconnected from the load, allowing it to maintain sufficient energy in its own output capacitor (e.g., Cboost) to maintain voltage regulation at a voltage above the regulated floor voltage VDD_MAIN, to enable charging the inductor on the next cycle. During this second portion of the operating cycle of charge injector 208, its inductor LCI may be discharging (i.e., energy stored in the inductor may be delivered to main voltage bus 206). Power is thus delivered to the load on both phases of the switching cycle, in contrast to a standard buck or boost converter, which delivers power to the load on one phase of the switching cycle.

As illustrated in FIG. 2, charge injector 208 includes a high side switch QH (210a) and a low side switch QL (210b). These switches may be alternately closed and opened so that charge injector 208 acts as a current source connected to main voltage bus 206. In some embodiments, charge injector 208 could be a multi-phase circuit. In either case, charge injector 208 may be operated with average current gearing using current window control to maintain an average current Iavg that is between a peak current Ipeak and a valley current Ivalley. More specifically, for operating conditions in which charge injector 208 is operated, it may be that the output voltage of power converter 204 (i.e., the voltage appearing across capacitor Cboost) is greater than the voltage of battery 202. Thus, when high side switch QH is closed, and low side switch QL is opened, a relatively higher voltage will drive current through charge injector inductor LCI delivering current to main bus 206 and storing energy in the inductor. Likewise, when high side switch QH is opened, and low side switch QL is closed, a relatively lower voltage will be presented to the input side of inductor LCI. The energy stored in inductor LCI will discharge to continue providing current/energy to main bus 206.

Figure 3:
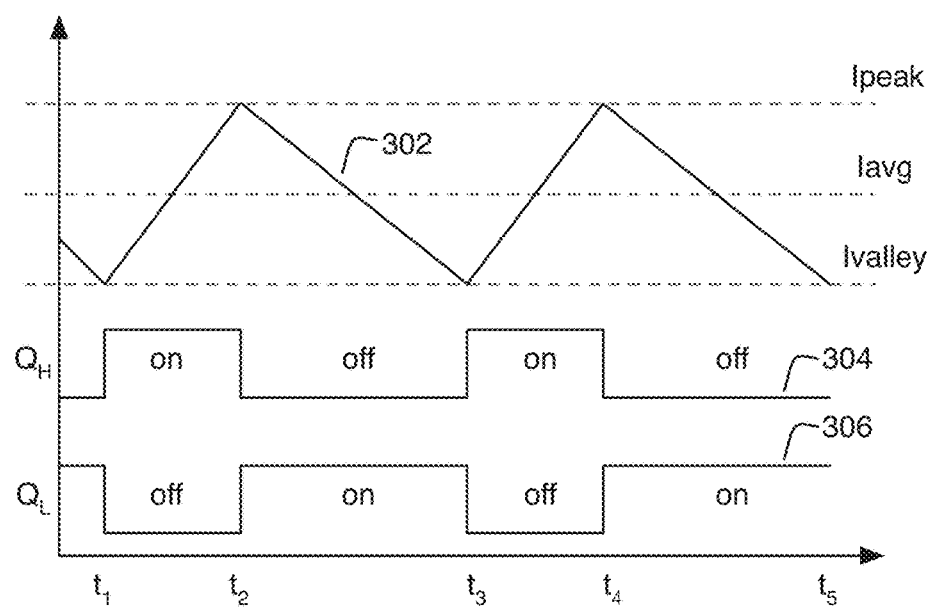
FIG. 3 depicts certain waveforms associated with operation of a charge injector.

In some embodiments, switches QH and QL may be controlled using a current window controller. FIG. 3 illustrates pertinent waveforms that illustrate the current window operation. More specifically, waveform 302 illustrates the current through inductor LCI. Waveform 304 illustrates a gate drive signal that may be provided to high side switch QH, and waveform CC06 illustrates a gate drive signal that may be provided to low side switch QL. In the illustrated traces, a high gate drive signal corresponds to turning on the switch, and a low gate drive signal corresponds to turning off the switch. However, it will be appreciated that depending on the particular types of switching devices used, the reverse could be true.

Beginning at time t1, inductor current 302 reaches a valley value Ivalley. At this point, switch QH may be turned on. Switch QL may also be turned off. In some embodiments, it may be desirable to implement a short delay between turning off the low side switch and turning on the high side switch to prevent cross-conduction. Once high side switch QH is turned on, inductor current 302 will begin linearly increasing, with the rate of increase being determined by the inductance of charge injector inductor LCI and the difference between the main bus voltage and the output voltage of power converter 204. Charge injector inductor current 302 may continue increasing until it reaches peak current Ipeak at time t2. At this point, high side switch QH may be turned off, and low side switch QL may be turned on. In some embodiments, it may be desirable to implement a short delay between turning off the high side switch and turning on the low side switch to prevent cross-conduction.

Beginning at time t2, with low side switch QL turned on and high side switch QH turned off, current will continue to flow through charge injector inductor LCI to main voltage bus 206. However, this current path will now pull energy directly from battery 202. At the same time, power converter 204 is disconnected from main voltage bus (by opening high side switch QH), so its internal voltage controller will control its switching to produce the desired voltage across its output capacitor Cboost. Because the voltage of battery 202 is less than the voltage of main voltage bus 206, the current through charge injector inductor LCI will linearly decrease, as energy stored in the inductor is discharged to the main voltage bus. The slope of this linear current decrease will be determined by the inductance value of inductor LCI and the difference between the voltage of main bus 206 and battery 202. In any case, charge injector inductor current 302 may continue decreasing until it reaches the valley current Ivalley at time t3. At time t3, low side switch QL may be turned off, and high side switch QH may be turned on, repeating the cycle.

As a result of the operation described above, an average current Iavg (between Ipeak and Ivalley) will be delivered by charge injector 208 to main voltage bus 206. This current is derived from energy stored in charge injector inductor LCI during the portion of the operating cycle in which charge injector 208 is drawing power from power converter 204.

Figure 4:
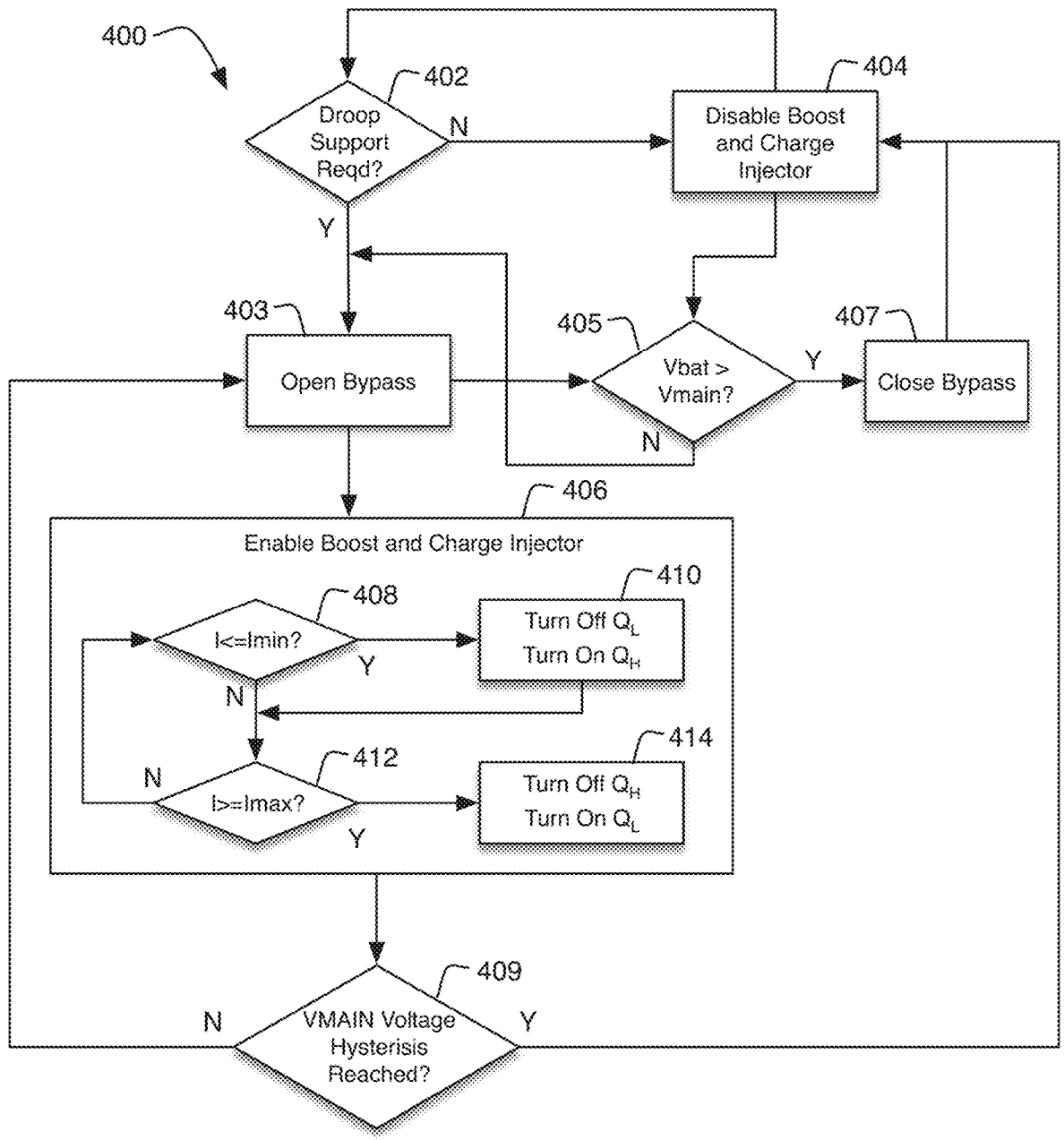
FIG. 4 is a flow chart illustrating operation of a charge injector.

FIG. 4 illustrates a flow chart depicting an overall control scheme 400 for the systems described above. This control scheme may be implemented by a suitable controller that is part of the power system. In some embodiments, the controller may be contained within charge injector 208. In other embodiments, the controller may reside in another component, such as power converter 204 or another system level controller of the personal electronic device. In any case, the controller may be implemented using analog circuitry, digital circuitry, or hybrid analog-digital circuitry. The controller may be implemented using discrete components, programmable microcontrollers, microprocessors, application specific integrated circuits (ASICs), field programmable gate arrays (FPGAs), and the like. In another embodiment, all components of the system may be integrated into a single integrated circuit.

With reference to FIG. 4, at block 402 the controller may determine whether droop support is required, i.e., whether operation of converter 204 and charge injector 208 is necessary or desirable to maintain adequate voltage on main voltage bus 206. This may be determined by comparing the main bus voltage to a main voltage bus threshold to determine when active operation is needed, as opposed to bypass operation. If droop support is not required, control may pass to block 404 in which power converter 204 and charge injector 208 may be disabled. If, at this point, the battery voltage input of the power system is greater than the main bus voltage (block 405), the bypass switch may be closed (block 407), and control may return to block 402, in which it may again be determined whether droop support is required. Note that the voltage at the battery cell may be higher than the battery voltage input of the power system due to IR drop across the routing path impedance between the cell and the input to the power system, which may include copper trace impedance and the impedance of protection circuits in the battery pack. The bypass switch control is dependent specifically on the voltage at the input of the power system, and not the battery cell voltage. Otherwise, the bypass may remain open, and control may pass directly to block 402. Control for power converter 204 may also be decoupled from control of charge injector 208. For example, switching control for power converter 204 may be based on the voltage at Cboost, rather than VDD-_MAIN.

If in block 402 it is determined that droop support is required (e.g., by monitoring the parameters described above), control may pass to block 403, in which the bypass switch is opened. Thence, control may also pass to block 406 in which charge injector 208 may be enabled. This results in operation of the charge injector control loop described below. Charge injection continues until the VMAIN voltage reaches a hysteresis voltage above the droop control voltage. If the hysteresis voltage is reached the boost and charge injector may be disabled (block 404) with control returning to block 402 to again determine whether droop support is required. When the charge injector is disabled, the battery voltage input to the power system may be compared with the VMAIN voltage to determine when the bypass switch may be closed.

When droop support is again required, the bypass switch is opened and charge injector 208 may be enabled, for example, by operating high side switch QH (210a) and low side switch QL (210b) to deliver current to main voltage bus 206. As described above, this operation may include alternately opening and closing high side switch QH and low side switch QL using a current window controller to provide an average output current between a valley current value Ivalley and a peak current value Ipeak. This mode of operation may be further understood with respect to the interior of block 406 in FIG. 4.

More specifically, control may passes to block 406, in which charge injector 208 is enabled, thence to block 408 in which the current through charge injector inductor LCI is compared to the minimum current value Imin. If the charge injector inductor current is less than or equal to the minimum current value, control may pass to block 410, in which the controller may turn off low side switch QL and turn on high side switch QH. This will result in the linearly increasing inductor current described above with respect to FIG. 3. After this point, control may pass to block 412. Alternatively, if the charge injector inductor current is not less than or equal to the minimum current value, control may pass directly to block 412.

In block 412, the controller may compare the charge injector inductor current to the maximum current value Imax. If the charge injector current is not greater than or equal to Imax, control may return to block 408, causing the controller to wait for a current minimum or maximum before initiating a switching event. Alternatively, if the current is greater than or equal to the maximum current, control may pass to block 414, in which the controller may turn off high side switch QH and turn on low side switch QL. At this point control proceed to block 409, in which it may be determined whether the main bus voltage hysteresis limit has been reached. If not, control returns to block 403, in which the bypass is opened, and control resumes as described above. Otherwise, if the main bus voltage hysteresis limit has been reached, control passes to block 404, in which the boost converter and charge injector may be disabled, with control returning to block 402, as described above. In other words, the control that determines if the charge injector is disabled is when the main bus voltage reaches a hysteresis level above the floor voltage that determines if droop support is required. Thus, the charge injector (or a stand-alone boost converter operated as an average current source) turns on when the main bus voltage droops below the floor target and turns off when the main bus voltage reaches the hysteresis target. When the charge injector is enabled, the bypass switch should be opened. As described above, the bypass switch can also have its own control, that can be independent of the droop support. The bypass must be opened when the charge injector is enabled but will close only when the battery voltage is greater than the main bus voltage.

Although the control technique is described in terms of a flow chart, as would be used to describe firmware or software based control of current injector 208, it will be appreciated that the control technique could also be implemented and or described in terms of a state machine, analog control loop, etc.

The foregoing describes exemplary embodiments of a power supply system for a battery-powered personal electronic device that includes a charge injector configured to assist in maintaining voltage regulation. More specifically, the charge injector may be employed to deliver energy to the main bus to maintain voltage regulation in the presence of current transients that, when coupled with increased internal impedance of the battery cell, and IR drop due to path impedance from the battery cell to the downstream system, would otherwise not permit the system to stay above a minimum voltage threshold. Such increased internal battery impedance may be associated with a variety conditions, including battery degradation associated with age and usage, as well as environmental conditions such as temperature.

Such systems may be used in a variety of applications but may be particularly advantageous when used in conjunction with battery powered personal electronic devices such as smartphones, smart watches, tablet computers, laptop computers, and associated accessories. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power system for a battery powered device, the power system comprising:
a power converter configured to have an input coupled to a battery and operable to convert a battery voltage to a level corresponding to a voltage higher than a main voltage bus of the battery powered device;
a charge injector having an input coupled to an output of the power converter and an output configured to be coupled to the main voltage bus, the charge injector comprising:
an energy storage element; and
one or more switching devices;
wherein the energy storage element and one or more switching devices are selectively operable to draw power from an output of the power converter and the battery to reduce voltage dips of the main voltage bus; and
one or more bypass switches operable to selectively couple the battery voltage to the main voltage bus bypassing the power converter and the charge injector.

2. The power system of claim 1 wherein the charge injector is operated as a current source.

3. The power system of claim 2 wherein the charge injector is operated as a switched current source.

4. The power system of claim 1 wherein:
the energy storage element comprises an inductor; and
the one or more switching devices comprise:
a high side switch coupled between an output of the power converter and a first terminal of the inductor;
a low side switch coupled between the battery and the first terminal of the charge injector inductor;
wherein a second terminal of the inductor is coupled to the output of the charge injector.

5. The power system of claim 4 wherein the high side switch and the low side switch are controlled by a current window controller to deliver a geared average current to the main voltage bus.

6. The power system of claim 5 wherein the current window controller is configured to alternately:
close the high side switch and open the low side switch, thereby charging the inductor with energy from the power converter; and
open the high side switch and close the low side switch, thereby discharging the inductor to the main voltage bus while drawing current from the battery.

7. The power system of claim 1 wherein the power converter is a charge pump.

8. The power system of claim 7 wherein the power converter is a multi-phase, series-parallel charge pump.

9. The power system of claim 1 wherein the power converter and the charge injector are an integrated device.

10. The power system of claim 1 wherein the power converter is a boost converter.

11. A charge injector for use in a power system of a battery operated device, the charge injector comprising:
a first input configured to be selectively coupled to an output of a power converter, wherein the power converter is configured to convert a battery voltage to a level higher than a main voltage bus of the battery operated device;
a second input configured to be selectively coupled to the battery;
an output configured to be coupled to a main voltage bus of the device;
an inductor coupled to the output;
a high side switch coupled between the first input and the inductor;
a low side switch coupled between the second input and the inductor, wherein the low side switch is operable to provide a current path from the battery to the main voltage bus through the inductor; and
a controller that alternately operates the hi h and low side s itches to deliver a geared average current to the main voltage bus.

12. The charge injector of claim 11 wherein the high side switch is operable to provide a current path from the power converter to the main voltage bus through the inductor.

13. The charge injector of claim 11 wherein the controller is a current window controller.

14. A method of operating a power converter and a current injector to deliver an average current to a voltage bus, the method comprising:
determining whether voltage droop support is required to minimize a voltage dip of the voltage bus associated with a current transient;

responsive to a determination that voltage droop support is not required, bypassing a power converter and charge injector;

responsive to a determination that voltage droop support is required, enabling the charge injector.

15. The method of claim 14 further comprising:

turning on a first switch of the charge injector to deliver an increasing current from the power converter to the voltage bus through an inductor; and turning on a second switch of the charge injector to deliver a decreasing current from a battery to the voltage bus through the inductor.

16. The method of claim 15 wherein turning on the first switch is performed in response to a predetermined minimum current through the inductor and turning on the second switch is performed in response to a predetermined maximum current through the inductor.

17. The method of claim 15 wherein:

turning on the first switch to deliver an increasing current from the power converter to the voltage bus through the inductor comprises turning off the second switch; and turning on the second switch to deliver a decreasing current from the battery to the voltage bus through the inductor comprises turning off the first switch.

* * * * *

UNITED STATES PATENT AND TRADEMARK OFFICE
CERTIFICATE OF CORRECTION

| | |
|---|---|
| PATENT NO. | : 12,027,979 B2 |
| APPLICATION NO. | : 17/198899 |
| DATED | : July 2, 2024 |
| INVENTOR(S) | : Adriane S. Niehaus and Parin Patel |

It is certified that error appears in the above-identified patent and that said Letters Patent is hereby corrected as shown below:

In the Claims

Column 10, Claim 11, Line 54, please replace the word "hi h" with --high--.

Column 10, Claim 11, Line 55, please replace the word "s itches" with --switches--.

Signed and Sealed this
Fifth Day of November, 2024

Katherine Kelly Vidal
*Director of the United States Patent and Trademark Office*